US012698652B2

(12) United States Patent
Iikawa et al.

(10) Patent No.: US 12,698,652 B2
(45) Date of Patent: Aug. 4, 2026

(54) VEHICLE DOOR CONTROL DEVICE

(71) Applicant: AISIN CORPORATION, Kariya (JP)

(72) Inventors: Taishi Iikawa, Kariya (JP); Gen Takatsuka, Kariya (JP); Hiroki Eba, Kariya (JP); Kimihide Kato, Kariya (JP)

(73) Assignee: AISIN CORPORATION, Kariya (JP)

( * ) Notice: Subject to any disclaimer, the term of this patent is extended or adjusted under 35 U.S.C. 154(b) by 350 days.

(21) Appl. No.: 18/468,809

(22) Filed: Sep. 18, 2023

(65) Prior Publication Data

US 2024/0110426 A1 Apr. 4, 2024

(30) Foreign Application Priority Data

Sep. 29, 2022 (JP) ................................ 2022-156900

(51) Int. Cl.
*E05B 81/06* (2014.01)
*E05B 81/16* (2014.01)
*E05B 81/20* (2014.01)

(52) U.S. Cl.
CPC .............. *E05B 81/06* (2013.01); *E05B 81/16* (2013.01); *E05B 81/20* (2013.01)

(58) Field of Classification Search
CPC ........... E05B 81/16; E05B 81/20; E05B 81/06
See application file for complete search history.

(56) References Cited

U.S. PATENT DOCUMENTS

2004/0020126 A1 2/2004 Matsui et al.
2022/0243503 A1* 8/2022 Osmialowski .......... E05B 77/00
2024/0052683 A1* 2/2024 Kim ........................ E05B 81/20

FOREIGN PATENT DOCUMENTS

JP 2003-336442 A 11/2003
JP 2011-032665 A 2/2011
JP 2015-155609 A 8/2015
JP 2019-138096 A 8/2019
WO WO-2011013585 A1 * 2/2011 ............. E05B 81/56

* cited by examiner

*Primary Examiner* — Dany E Akakpo
(74) *Attorney, Agent, or Firm* — Oblon, McClelland, Maier & Neustadt, L.L.P.

(57) ABSTRACT

A vehicle door control device controlling a motor and a door lock device of a door. During a closing operation of the door based on a closing operation command signal, the motor is driven to cause the door to perform the closing operation until shift of a latch mechanism from the unlatching state to the half-latching state is detected. The latch mechanism is shifted from the half-latching state to the full-latching state by starting driving of the door lock device simultaneously with or before or after completion of the closing operation of the door. When the shift of the latch mechanism from the half-latching state to the full-latching state is detected, position correction control of correcting a position of the door by driving the motor such that a force in an opening direction acts on the door is executed.

4 Claims, 5 Drawing Sheets

HALF-LATCHING STATE

FULL-LATCHING STATE

VEHICLE DOOR CONTROL DEVICE

CROSS REFERENCE TO RELATED APPLICATIONS

This application is based on and claims priority under 35 U.S.C. § 119 to Japanese Patent Application 2022-156900, filed on Sep. 29, 2022, the entire content of which is incorporated herein by reference.

TECHNICAL FIELD

This disclosure relates to a vehicle door control device.

BACKGROUND DISCUSSION

In the related art, a vehicle has been known that includes: a door configured to open and close a door opening of a vehicle body; a drive device including a motor configured to drive the door to open and close, a door lock device configured to restrain the door; and a door control device configured to control driving of the drive device and the door lock device (for example, see JP 2019-138096A).

The door lock device is configured to shift among a full-latching state in which the door is restrained to the vehicle body at a fully-closed position, a half-latching state in which the door is restrained to the vehicle body at a half-closed position, and an unlatching state in which the door is not restrained to the vehicle body.

When a closing operation signal is received, the door control device drives the motor of the drive device to cause the door to perform a closing operation. When the door control device detects the shift of the door lock device from the unlatching state to the half-latching state, the door control device stops power supply to the motor to end the closing operation of the door, and drives the door lock device to shift to the full-latching state. Accordingly, the door is located at the fully-closed position.

In a vehicle including a door that rotates about a rotation axis extending along an upper edge of a door opening, such as a hatchback door, a weather strip configured to seal between a vehicle body and the door is provided at an outer peripheral portion of the door opening. Since the weather strip is compressed by the door, performance of sealing between the vehicle body and the door is secured.

In such a vehicle, when power supply to a motor of a drive device is stopped after a door lock device shifts from an unlatching state to a half-latching state, the door may move in an opening direction due to a reaction force of the weather strip. Accordingly, abnormal noise may be generated due to vibration of the door or sliding of the door and the vehicle body. For this reason, an occupant may be given a feeling of discomfort.

In addition, due to a wear amount of the weather strip, a variation in assembly accuracy of the vehicle, and the like, the door may be drawn to a vehicle inner side beyond a normal fully-closed position in the closing operation. Even when the door drawn to the vehicle inner side beyond the normal fully-closed position moves in the opening direction due to the reaction force of the weather strip, the door may not return to the normal fully-closed position. Further, the door may be distorted by a force of drawing the door toward the vehicle inner side by the drive device. In these cases, since a step is generated between the vehicle body and the door, an appearance of the vehicle may be impaired. In this regard as well, the occupant may be given a feeling of discomfort.

In view of the above, it is desired to reduce the feeling of discomfort given to the occupant.

SUMMARY

According to an aspect of this disclosure, a vehicle door control device is provided that is applied to a vehicle, the vehicle including: a door configured to open and close a door opening of a vehicle body by rotating about a rotation axis extending along an upper edge of the door opening; a drive device including a motor configured to drive the door to open and close; and a door lock device configured to change a restraint state of the door with respect to the vehicle body, the vehicle door control device controlling driving of the motor and driving of the door lock device. The door lock device includes a latch mechanism configured to shift among a full-latching state in which the door is restrained to the vehicle body at a fully-closed position, a half-latching state in which the door is restrained to the vehicle body at a half-closed position, and an unlatching state in which the door is not restrained to the vehicle body. During a closing operation of the door based on a closing operation command signal, the motor is driven to cause the door to perform the closing operation until shift of the latch mechanism from the unlatching state to the half-latching state is detected. The latch mechanism is shifted from the half-latching state to the full-latching state by starting driving of the door lock device simultaneously with or before or after completion of the closing operation of the door. When the shift of the latch mechanism from the half-latching state to the full-latching state is detected, position correction control of correcting a position of the door by driving the motor such that a force in an opening direction acts on the door is executed.

According to another aspect of this disclosure, a vehicle door control device is provided that is applied to a vehicle, the vehicle including: a door configured to open and close a door opening of a vehicle body by rotating about a rotation axis extending along an upper edge of the door opening; a weather strip fixed to an outer peripheral portion of the door opening to seal between the vehicle body and the door; a drive device including a motor configured to drive the door to open and close; and a door lock device configured to change a restraint state of the door with respect to the vehicle body, the vehicle door control device controlling driving of the motor and driving of the door lock device. The door lock device includes a latch mechanism configured to shift among a full-latching state in which the door is restrained to the vehicle body at a fully-closed position, a half-latching state in which the door is restrained to the vehicle body at a half-closed position, and an unlatching state in which the door is not restrained to the vehicle body. During a closing operation of the door based on a closing operation command signal, the motor is driven to cause the door to perform the closing operation until shift of the latch mechanism from the unlatching state to the half-latching state is detected. When the shift of the latch mechanism from the unlatching state to the half-latching state is detected, braking control of applying a braking force to the door by regenerative braking action of the motor is executed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment in which a vehicle door control device is embodied as a door control device for a vehicle back door will be described with reference to FIGS. 1 to 7.

Vehicle 10

Figure 1:
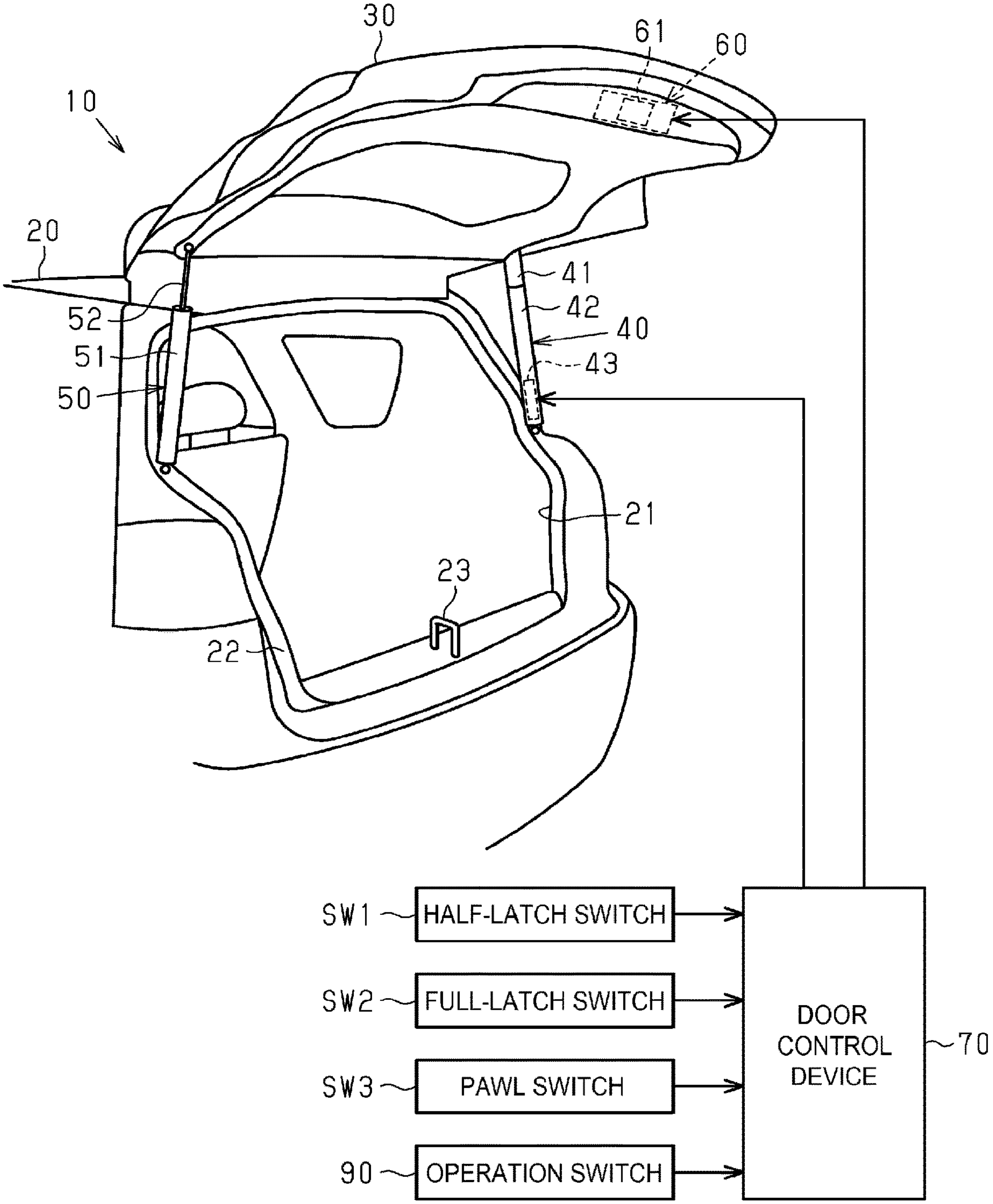
FIG. 1 is a schematic diagram illustrating a schematic configuration of a vehicle including a vehicle door control device according to an embodiment.

As illustrated in FIG. 1, a vehicle 10 includes a vehicle body 20 having a door opening 21 at a rear portion thereof, a back door 30 configured to open and close the door opening 21, and a weather strip 22 fixed to an outer peripheral portion of the door opening 21 and configured to seal between the vehicle body 20 and the back door 30. The vehicle 10 also includes a drive device 40 configured to drive the back door 30 to open and close, and a gas spring 50 configured to support the back door 30. The vehicle 10 also includes a door lock device 60 configured to change a restraint state of the back door 30 with respect to the vehicle body 20, and a door control device 70 configured to control the drive device 40 and the door lock device 60.

A striker 23 configured to engage with the door lock device 60 protrudes from a lower end portion of the door opening 21.

Back Door 30

The back door 30 is rotatable about a rotation axis extending along an upper edge of the door opening 21. More specifically, the back door 30 is rotatable via a hinge (not shown) including a rotation shaft extending in a vehicle width direction.

The back door 30 is displaced between a fully-closed position where the back door 30 fully closes the door opening 21 and a fully open position where the back door 30 fully opens the door opening 21.

Drive Device 40

The drive device 40 is provided, for example, at a portion on one side of the back door 30 in the vehicle width direction.

The drive device 40 includes an inner cylinder 41, an outer cylinder 42 that accommodates one end of the inner cylinder 41, and a motor 43 provided inside the inner cylinder 41 or the outer cylinder 42. For example, one end portion of the inner cylinder 41 is rotatably supported on the back door 30. For example, one end portion of the outer cylinder 42 is rotatably supported on the vehicle body 20.

A spindle screw (not shown) is provided inside the inner cylinder 41 and the outer cylinder 42. When the spindle screw is rotated by the motor 43 serving as a driving source, the inner cylinder 41 and the outer cylinder 42 are relatively moved in an axial direction. Accordingly, the drive device 40 expands and contracts, whereby the back door 30 is driven to open and close. At the time of expansion, the drive device 40 applies, to the back door 30, a force for causing the back door 30 to perform an opening operation. At the time of contraction, the drive device 40 applies, to the back door 30, a force for causing the back door 30 to perform a closing operation.

The drive device 40 constantly biases the back door 30 in an opening direction by a spring (not shown) disposed between the inner cylinder 41 and the outer cylinder 42. Accordingly, the drive device 40 biases the back door 30 in the opening direction even in a state where power supply to the motor 43 is stopped.

Figure 2:
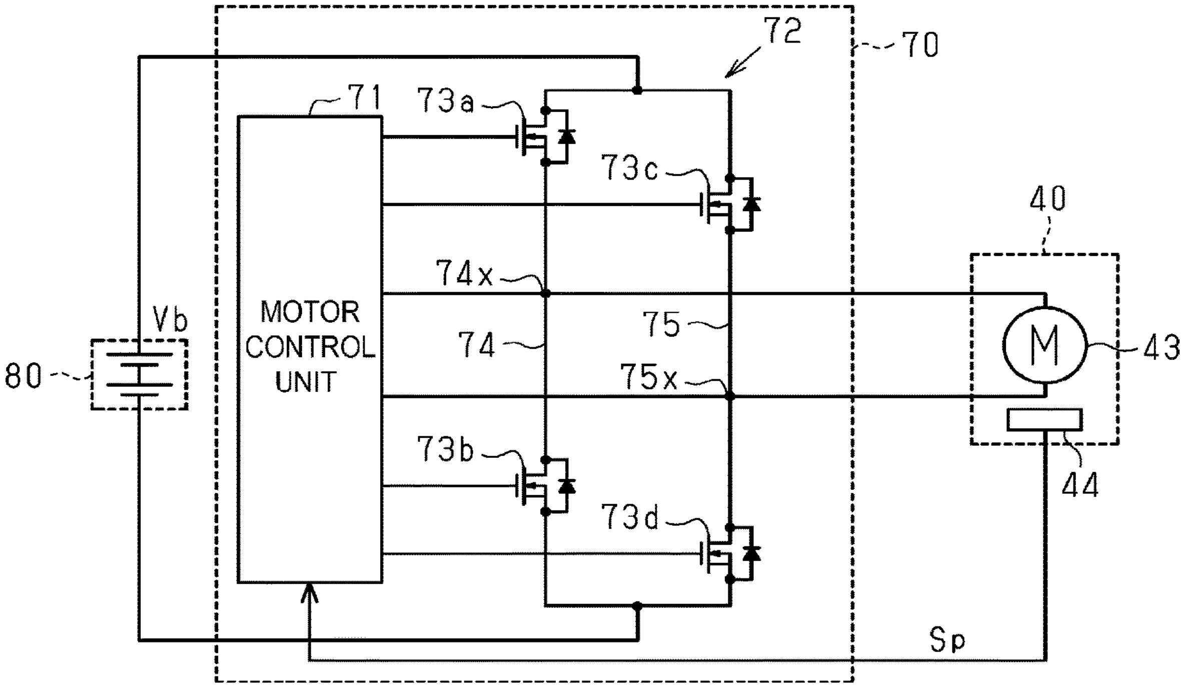
FIG. 2 is a schematic diagram illustrating a configuration of the door control device and a drive device in FIG. 1.

As illustrated in FIG. 2, the drive device 40 includes one or more pulse sensors 44 configured to output a pulse signal Sp synchronized with the rotation of the motor 43 to the door control device 70.

Gas Spring 50

As illustrated in FIG. 1, the gas spring 50 includes, for example, a cylinder 51, a piston rod 52, and a high-pressure gas sealed between the cylinder 51 and the piston rod 52. For example, one end portion of the cylinder 51 is rotatably supported on the vehicle body 20. For example, one end portion of the piston rod 52 is rotatably supported on the back door 30. The gas spring 50 constantly biases the back door 30 in the opening direction.

Door Lock Device 60

The door lock device 60 includes a latch mechanism 61 supported on the back door 30 via a base plate (not shown).

Figure 3:
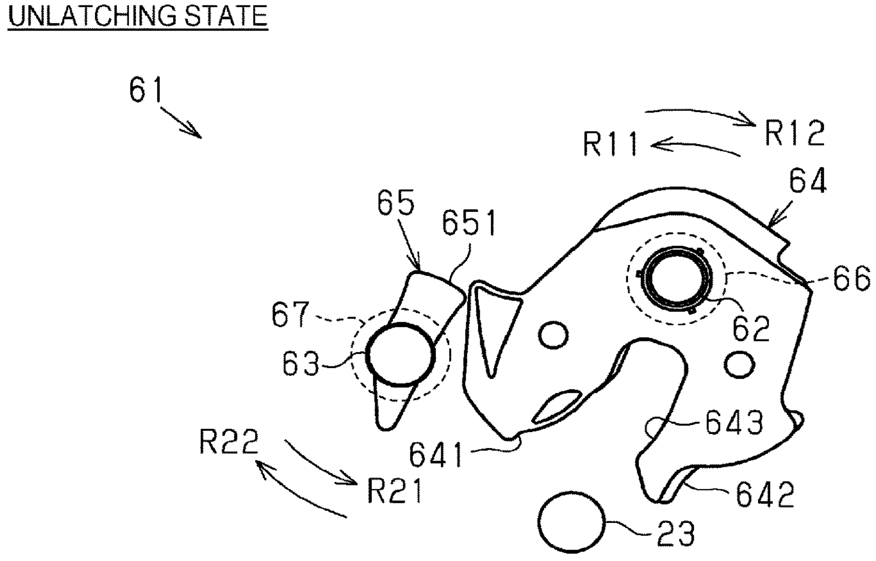
FIG. 3 is a schematic diagram illustrating a latch mechanism in an unlatching state in a door lock device in FIG. 1.

As illustrated in FIG. 3, the latch mechanism 61 includes a latch support shaft 62, a pawl support shaft 63, a latch 64, a pawl 65, a latch spring 66, and a pawl spring 67. As illustrated in FIG. 1, the latch mechanism 61 includes a half-latch switch SW1, a full-latch switch SW2, and a pawl switch SW3.

As illustrated in FIG. 3, the latch support shaft 62 and the pawl support shaft 63 are spaced apart from each other. An axis of the latch support shaft 62 and an axis of the pawl support shaft 63 extend in parallel. The latch support shaft 62 rotatably supports the latch 64. The pawl support shaft 63 rotatably supports the pawl 65. The latch 64 is biased in a first rotation direction R11 by the latch spring 66. The pawl 65 is biased in a second rotation direction R22 by the pawl spring 67.

The latch 64 includes a first engagement portion 641 and a second engagement portion 642 that are spaced apart from each other in a rotation direction of the latch 64. The latch 64 includes a striker engagement groove 643 configured to accommodate the striker 23. The striker engagement groove 643 is formed between the first engagement portion 641 and the second engagement portion 642.

The latch 64 keeps a posture, in which the striker engagement groove 643 is directed toward the striker 23, by contacting a latch stopper (not shown).

The pawl 65 includes a third engagement portion 651 configured to engage with the first engagement portion 641 and the second engagement portion 642 of the latch 64. When the third engagement portion 651 contacts the latch 64, the pawl 65 is positioned relative to the latch 64.

Hereinafter, as illustrated in FIG. 3, a state in which the striker engagement groove 643 of the latch 64 is directed toward the striker 23 in the latch mechanism 61 is referred to as an "unlatching state". When the latch mechanism 61 is in the unlatching state, since engagement between the latch 64 and the striker 23 is released, the back door 30 is not restrained to the vehicle body 20, that is, the back door 30 can be operated to open and close.

Figure 4:
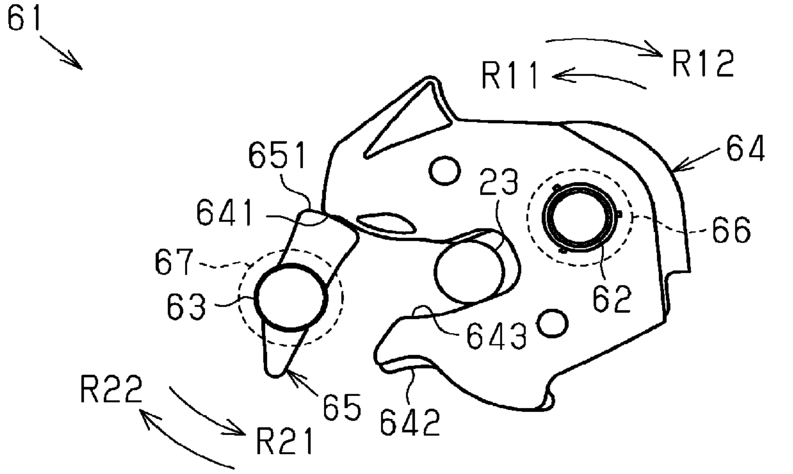
FIG. 4 is a schematic diagram illustrating the latch mechanism in a half-latching state in the door lock device in FIG. 1.

As illustrated in FIG. 4, when the first engagement portion 641 of the latch 64 and the third engagement portion 651 of the pawl 65 are engaged with each other in the latch mechanism 61, the latch 64 cannot rotate in the first rotation direction R11. Hereinafter, a state in which the first engagement portion 641 of the latch 64 and the third engagement portion 651 of the pawl 65 are engaged with each other in the latch mechanism 61 is referred to as a "half-latching state". When the latch mechanism 61 is in the half-latching state, the latch 64 cannot move in the opening direction of the back door 30 with respect to the striker 23. When the latch mechanism 61 is in the half-latching state, the back door 30 is restrained at a half-closed position with respect to the vehicle body 20.

Figure 5:
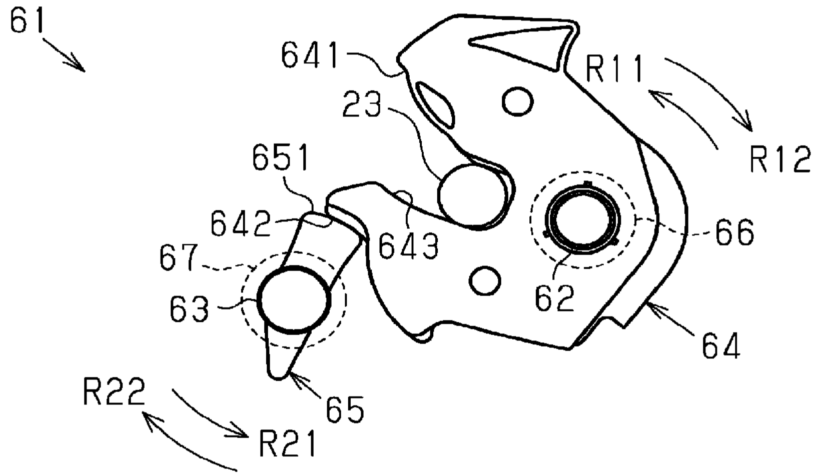
FIG. 5 is a schematic diagram illustrating the latch mechanism in a full-latching state in the door lock device in FIG. 1.

As illustrated in FIG. 5, when the second engagement portion 642 of the latch 64 and the third engagement portion 651 of the pawl 65 are engaged with each other in the latch mechanism 61, the latch 64 cannot rotate in the first rotation direction R11. Hereinafter, a state in which the second engagement portion 642 of the latch 64 and the third engagement portion 651 of the pawl 65 are engaged with each other in the latch mechanism 61 is referred to as a "full-latching state". When the latch mechanism 61 is in the full-latching state, the latch 64 cannot move in the opening direction of the back door 30 with respect to the striker 23. When the latch mechanism 61 is in the full-latching state, the back door 30 is restrained at the fully-closed position with respect to the vehicle body 20.

The door lock device 60 switches the state of the latch mechanism 61 between the half-latching state and the full-latching state by transmitting power of a motor (not shown) to the latch 64 and the pawl 65 of the latch mechanism 61. Hereinafter, shifting the latch mechanism 61 from the half-latching state to the full-latching state by driving the door lock device 60 is referred to as a closing operation.

Driving Mode of Door Lock Device 60

As illustrated in FIG. 3, when the back door 30 performs the closing operation to the vicinity of the fully-closed position, the latch 64 approaches the striker 23.

As illustrated in FIG. 4, when the back door 30 further performs the closing operation, the striker 23 starts to enter the striker engagement groove 643. At this time, the latch 64 receives a reaction force from the striker 23, and thus rotates in a second rotation direction R12 against a biasing force of the latch spring 66. On the other hand, the pawl 65 is pushed by the latch 64 rotating in the second rotation direction R12, and thus rotates in a first rotation direction R21 against a biasing force of the pawl spring 67.

When the latch 64 rotates to a position shown in FIG. 4, the pawl 65 returns to a position before the rotation under the biasing force of the pawl spring 67. As a result, the third engagement portion 651 of the pawl 65 engages with the first engagement portion 641 of the latch 64. Thus, the latch mechanism 61 enters the half-latching state, and the back door 30 is positioned at the half-closed position. When the latch mechanism 61 enters the half-latching state, the closing operation of the back door 30 by the drive device 40 is stopped. Further, the door lock device 60 performs a closing operation of the latch mechanism 61.

As illustrated in FIG. 5, when the latch 64 is rotated in the second rotation direction R12 from a half-latching position by the door lock device 60, the latch 64 and the striker 23 move relative to each other, so that the striker 23 is positioned on a back side of the striker engagement groove 643. On the other hand, the pawl 65 is pushed by the latch 64 rotating in the second rotation direction R12, and thus rotates in the first rotation direction R21 against the biasing force of the pawl spring 67.

When the latch 64 rotates to a position shown in FIG. 5, the pawl 65 returns to the position before the rotation under the biasing force of the pawl spring 67. As a result, the third engagement portion 651 of the pawl 65 engages with the second engagement portion 642 of the latch 64. Thus, the latch mechanism 61 enters the full-latching state, and the back door 30 is positioned at the fully-closed position. When the latch mechanism 61 enters the full-latching state, a closing operation of the door lock device 60 is stopped.

Figure 6:
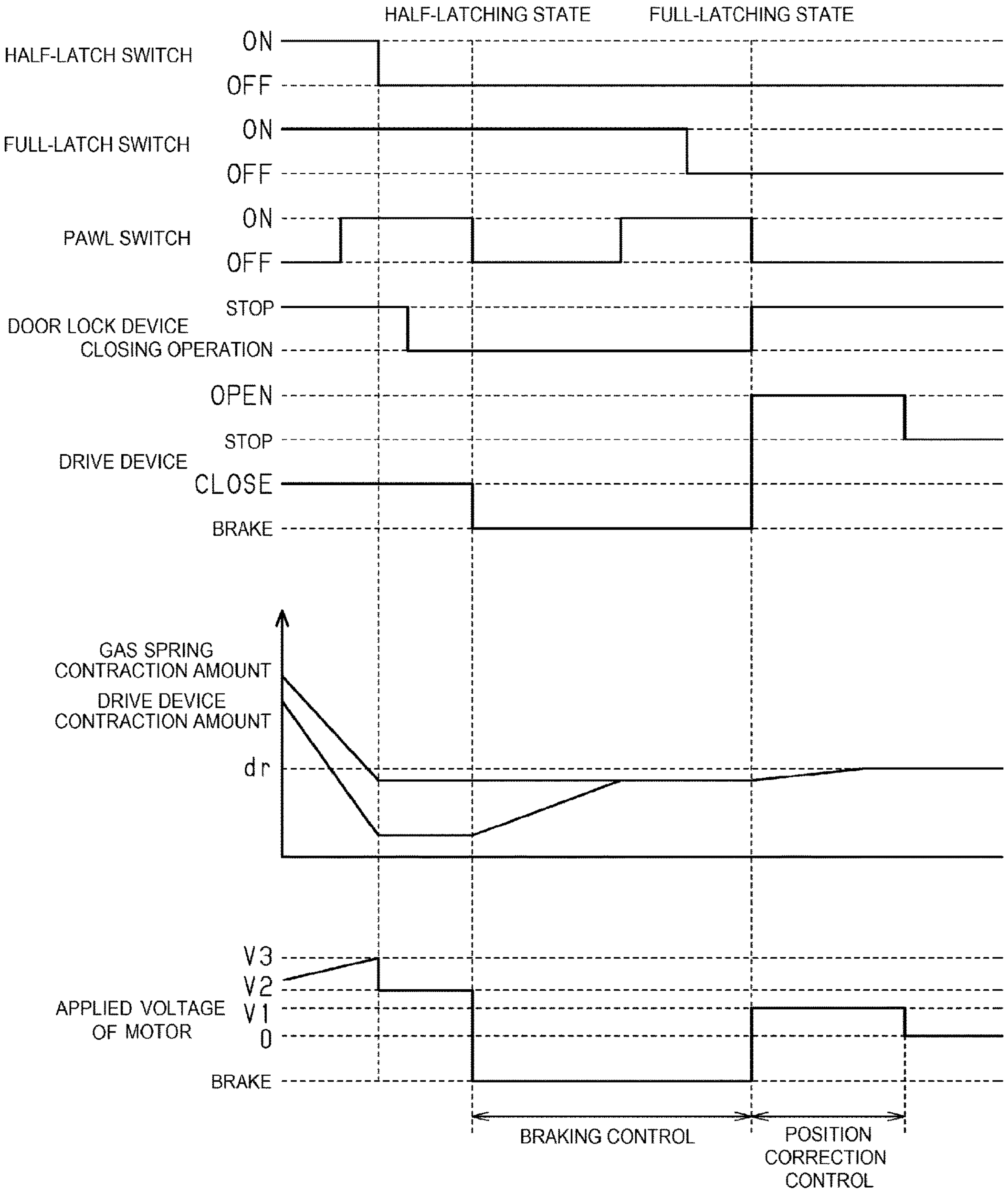
FIG. 6 is a timing chart illustrating a relationship between a mode of the door control device, expansion and contraction amounts of the drive device and a gas spring, and a driving mode of a motor of the drive device in a closing operation of a back door in FIG. 1.

As illustrated in FIG. 6, the half-latch switch SW1, the full-latch switch SW2, and a pawl switch SW3 are switches for detecting a state of the latch mechanism 61. The half-latch switch SW1, the full-latch switch SW2, and the pawl switch SW3 output a signal corresponding to a position of the latch 64 and a position of the pawl 65 to the door control device 70. More specifically, the half-latch switch SW1, the full-latch switch SW2, and the pawl switch SW3 output a signal indicating an on/off state to the door control device 70 in conjunction with an operation of the latch mechanism 61.

In a process in which the latch mechanism 61 shifts from the unlatching state to the half-latching state, the pawl switch SW3 is changed from off to on since the pawl 65 is pushed by the latch 64 and rotated in the first rotation direction R21. When the latch mechanism 61 shifts from the unlatching state to the half-latching state, the pawl 65 rotates in the second rotation direction R22 and returns to an original position. Accordingly, the pawl switch SW3 changes from on to off.

The half-latch switch SW1 changes from on to off at a timing between an on timing and an off timing of the pawl switch SW3 while the full-latch switch SW2 is on.

In a process in which the latch mechanism 61 shifts from the half-latching state to the full-latching state, the pawl switch SW3 is changed from off to on since the pawl 65 is pushed by the latch 64 and rotated in the first rotation direction R21. When the latch mechanism 61 shifts from the half-latching state to the full-latching state, the pawl 65 rotates in the second rotation direction R22 and returns to the original position. Accordingly, the pawl switch SW3 changes from on to off.

The full-latch switch SW2 changes from on to off at a timing between an on timing and an off timing of the pawl switch SW3 while the half-latch switch SW1 is off.

Operation Switch 90

As illustrated in FIG. 1, an operation switch 90 outputs, to the door control device 70, an opening operation command signal for commanding an opening operation of the back door 30 and a closing operation command signal for commanding a closing operation of the back door 30. Examples of the operation switch 90 include a switch provided in the back door 30, a vehicle interior, or the like, and a switch provided in a portable device such as an electronic key or a smartphone.

Door Control Device 70

The door control device 70 causes the back door 30 to perform the opening operation by controlling the driving of the motor 43 of the drive device 40 and the driving of the motor of the door lock device 60 based on the opening operation command signal received from the operation switch 90. The door control device 70 causes the back door 30 to perform the closing operation by controlling the driving of the motor 43 of the drive device 40 and the driving of the motor of the door lock device 60 based on the closing operation command signal received from the operation switch 90.

The door control device 70 controls the driving of the motor 43 of the drive device 40 and the driving of the motor of the door lock device 60 based on signals indicating on/off states of the half-latch switch SW1, the full-latch switch SW2, and the pawl switch SW3.

For example, the door control device 70 detects an opening/closing speed and a door opening degree of the back door 30 based on the pulse signal Sp received from the pulse sensor 44.

As illustrated in FIG. 2, the door control device 70 includes a motor control unit 71 configured to generate a motor control signal, and a drive circuit 72 configured to supply electric power to the motor 43 based on the motor control signal.

As the drive circuit 72, a known PWM inverter in which a plurality of switching elements 73*a*, 73*b*, 73*c*, and 73*d* that are turned on and off based on the motor control signal are connected in an H-bridge manner is used. For example, field effect transistors (FET) are used as the switching elements 73*a*, 73*b*, 73*c*, and 73*d*.

The drive circuit 72 has a configuration in which a first switching arm 74 and a second switching arm 75 are connected in parallel. The first switching arm 74 includes the switching elements 73*a* and 73*b* connected in series, and the second switching arm 75 includes the switching elements 73*c* and 73*d* connected in series. In the drive circuit 72, a power supply voltage Vb of an in-vehicle power supply 80 is applied to the switching elements 73*a* and 73*c* of the switching arms 74 and 75, and the switching elements 73*b* and 73*d* of the switching arms 74 and 75 are grounded. A connection point 74*x* between the switching elements 73*a* and 73*b* of the first switching arm 74 and a connection point 75*x* between the switching elements 73*c* and 73*d* of the second switching arm 75 are connection points to connection terminals of the motor 43.

When the motor 43 is to be rotated in a first direction, the motor control unit 71 turns on the switching elements 73*a* and 73*d* and turns off the switching elements 73*b* and 73*c* by outputting the motor control signal. When the motor 43 is to be rotated in a second direction opposite to the first direction, the motor control unit 71 turns on the switching elements 73*b* and 73*c* and turns off the switching elements 73*a* and 73*d* by outputting the motor control signal. The motor control unit 71 controls a duty ratio of each of the switching elements 73*a*, 73*b*, 73*c*, and 73*d* through the output of the motor control signal to change a driving force generated by the motor 43.

Braking Control

As illustrated in FIG. 6, when the shift of the latch mechanism 61 from the unlatching state to the half-latching state is detected, the door control device 70 executes braking control of applying a braking force to the back door 30 by regenerative braking action of the motor 43.

As illustrated in FIG. 2, in the braking control, the motor control unit 71 turns on the switching elements 73*a* and 73*c* and turns off the switching elements 73*b* and 73*d*, thereby bringing the drive circuit 72 into a regenerative braking state. In the regenerative braking state, since terminals of each phase of the motor 43 are short-circuited, when the motor 43 is rotated by an external force, a back electromotive force is generated in the motor 43. Since the rotation of the motor 43 is hindered by the back electromotive force, a braking force is applied to the back door 30. In the braking control, the motor control unit 71 may turn on the switching elements 73*b* and 73*d* and turn off the switching elements 73*a* and 73*c*, thereby bringing the drive circuit 72 into the regenerative braking state.

Position Correction Control

As illustrated in FIG. 6, when the shift of the latch mechanism 61 from the half-latching state to the full-latching state is detected, the door control device 70 executes position correction control of correcting a position of the back door 30. In the position correction control, the door control device 70 drives the motor 43 such that a force in the opening direction acts on the back door 30. In the position correction control, for example, a voltage V1 smaller than a voltage, which is applied during the opening operation of the back door 30 based on the opening operation command signal, is applied to the motor 43. Accordingly, when the back door 30 after the closing operation is drawn to the vehicle inner side beyond the normal fully-closed position, the back door 30 moves toward the normal fully-closed position.

In the position correction control, since a force in the opening direction acts on the back door 30 that is restrained to the vehicle body 20 by the latch mechanism 61, a load is generated in the back door 30 and the door lock device 60. Therefore, a value of the voltage V1 is a value at the time when the load is within an allowable range, and is set to a value smaller than a constant voltage applied during the opening operation of the back door 30 based on the opening operation command signal.

Next, a procedure of processing executed by the door control device 70 will be described with reference to a timing chart shown in FIG. 6 and a flowchart shown in FIG. 7.

Figure 7:
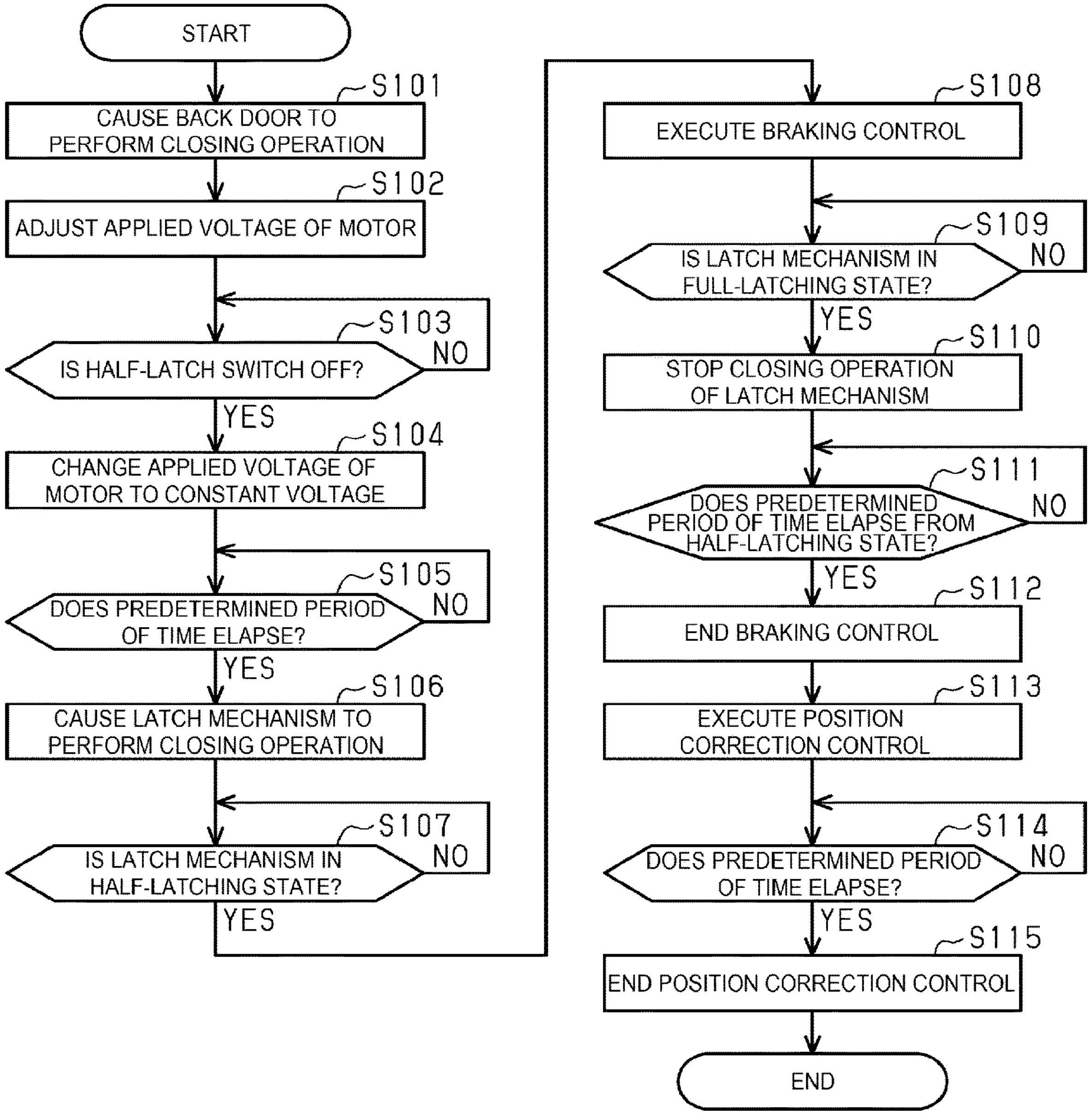
FIG. 7 is a flowchart illustrating a procedure of processing performed by the door control device in the closing operation of the back door in FIG. 1.

As illustrated in FIG. 7, the door control device 70 starts the closing operation of the back door 30 in an open state based on a closing operation command signal received from the operation switch 90 (step S101).

Next, the door control device 70 adjusts an applied voltage of the motor 43 such that the closing speed of the back door 30 follows a predetermined target speed (step S102).

As illustrated in FIG. 6, for example, when the door opening degree of the back door 30 is equal to or less than a predetermined door opening degree at least, the door control device 70 gradually increases the applied voltage of the motor 43 at a constant rate. Accordingly, the back door 30 performs the closing operation while compressing the weather strip 22. In step S102, as the applied voltage of the motor 43 gradually increases, a voltage V3 larger than the voltage V1 is finally applied to the motor 43.

Here, during the closing operation of the back door 30, a driving force of the drive device 40 is transmitted to the gas spring 50 via the back door 30, and thus the gas spring 50 contracts. Therefore, during the closing operation of the back door 30, the drive device 40 is likely to contract prior to the gas spring 50. In this case, since a contraction amount of the drive device 40 and a contraction amount of the gas spring 50 are different from each other, the back door 30 performs the closing operation in a posture inclined with respect to a normal posture.

Hereinafter, a contraction amount of each of the drive device 40 and the gas spring 50 at the time when the back door 30 is positioned at the normal fully-closed position is defined as a reference contraction amount dr. In step S102, the door control device 70 drives the drive device 40 such that the contraction amount of the drive device 40 is smaller than the reference contraction amount dr. Accordingly, a portion of the back door 30 to which the drive device 40 is fixed is drawn further to the vehicle inner side than a portion of the back door 30 to which the gas spring 50 is fixed. At this time, the contraction amount of the gas spring 50 is, for example, larger than the contraction amount of the drive device 40 and smaller than the reference contraction amount dr. That is, both the portion of the back door 30 to which the drive device 40 is fixed and the portion of the back door 30 to which the gas spring 50 is fixed are drawn to the vehicle inner side.

As illustrated in FIG. 7, next, the door control device 70 determines whether the half-latch switch SW1 is off (step S103). When the half-latch switch SW1 is off (step S103: YES), the door control device 70 changes the applied voltage of the motor 43 to a constant voltage V2 (step S104). When the half-latch switch SW1 is not off, that is, when the half-latch switch SW1 is on (step S103: NO), the door control device 70 repeats step S103.

As illustrated in FIG. 6, the voltage V2 applied to the motor 43 in step S104 is set to a value larger than the voltage V1 and smaller than the voltage V3. The voltage V2 is set to, for example, a value such that a force of moving the back door 30 in the closing direction is balanced with the reaction force of the weather strip 22. Accordingly, while the voltage V2 is applied to the motor 43, a position of the back door 30 in a state where the weather strip 22 is compressed is maintained. That is, while the voltage V2 is applied to the motor 43, the contraction amount of the drive device 40 and the contraction amount of the gas spring 50 do not change.

As illustrated in FIG. 7, next, the door control device 70 determines whether a predetermined period of time elapses since the half-latch switch SW1 is turned off (step S105). When the predetermined period of time elapses since the half-latch switch SW1 is turned off (step S105: YES), the door control device 70 causes the latch mechanism 61 to perform the closing operation (step S106). Accordingly, the back door 30 whose position is maintained in the state where the weather strip 22 is compressed moves in the closing direction by the closing operation of the latch mechanism 61. When the predetermined period of time does not elapse since the half-latch switch SW1 is turned off (step S105: NO), the door control device 70 repeats step S105. For example, the predetermined period of time is set to be equal to or shorter than the shortest period of time required from when the half-latch switch SW1 is turned off to when the pawl switch SW3 is turned off during the closing operation of the back door 30.

Next, the door control device 70 determines whether the latch mechanism 61 is in the half-latching state (step S107). More specifically, the door control device 70 determines whether the half-latch switch SW1 is off, the full-latch switch SW2 is on, and the pawl switch SW3 is off.

When the latch mechanism 61 is in the half-latching state (step S107: YES), the door control device 70 executes the braking control (step S108). When the braking control is executed, the power supply to the motor 43 is stopped by the door control device 70, and thus the back door 30 is about to move in the opening direction by the reaction force of the weather strip 22. At this time, since a braking force is applied to the back door 30 in the braking control, a speed of the back door 30 at the time of moving in the opening direction is gradually reduced. When the latch mechanism 61 is not in the half-latching state (step S107: NO), the door control device 70 repeats step S107.

As illustrated in FIG. 6, when the back door 30 moves in the opening direction during execution of the braking control, the contraction amount of the drive device 40 gradually increases, and the contraction amount of the gas spring 50 does not change, or slightly gradually increases. That is, during execution of the braking control, the portion of the back door 30 to which the drive device 40 is fixed moves in the opening direction, and the portion of the back door 30 to which the gas spring 50 is fixed does not move or slightly moves in the opening direction. Since the contraction amount of the drive device 40 gradually increases, the contraction amount of the drive device 40 and the contraction amount of the gas spring 50 become the same. At this time, the contraction amount of each of the drive device 40 and the gas spring 50 is smaller than the reference contraction amount dr.

As illustrated in FIG. 7, next, the door control device 70 determines whether the latch mechanism 61 is in the full-latching state (step S109). More specifically, the door control device 70 determines whether the half-latch switch SW1 is off, the full-latch switch SW2 is off, and the pawl switch SW3 is off.

When the latch mechanism 61 is in the full-latching state (step S109: YES), the door control device 70 stops the closing operation of the latch mechanism 61 (step S110). When the latch mechanism 61 is not in the full-latching state (step S109: NO), the door control device 70 repeats step S109.

Next, the door control device 70 determines whether a predetermined period of time elapses since the shift of the latch mechanism 61 from the unlatching state to the half-latching state is detected (step S111). When the predetermined period of time elapses since the half-latching state of the latch mechanism 61 is detected (step S111: YES), the door control device 70 ends the braking control (step S112). When the predetermined period of time does not elapse since the half-latching state of the latch mechanism 61 is detected (step S111: NO), the door control device 70 repeats step S111.

Here, even when the shift of the latch mechanism 61 from the half-latching state to the full-latching state is detected, the door control device 70 continues the execution of the braking control until the predetermined period of time elapses since the latch mechanism 61 shifts from the unlatching state to the half-latching state.

FIG. 6 illustrates, as an example of a timing chart, a timing chart in a case where the shift of the latch mechanism 61 to the full-latching state in step S109 and the elapse of the predetermined period of time in step S111 are completed simultaneously. The elapse of the predetermined period of time in step S111 may be completed before the shift of the latch mechanism 61 to the full-latching state in step S109, or may be completed after the shift. Therefore, the braking control is continued at least until the shift of the latch mechanism 61 to the full-latching state in step S109 is completed.

As illustrated in FIG. 7, next, the door control device 70 executes the position correction control (step S113).

As illustrated in FIG. 6, in step S113, the door control device 70 applies the constant voltage V1 to the motor 43. The voltage V1 is smaller than the voltage V2 applied to the motor 43 in step S104. When the position correction control is executed, a force in the opening direction acts on the back door 30, and thus the contraction amounts of the drive device 40 and the gas spring 50 gradually increase. Thereafter, the respective contraction amounts of the drive device 40 and the gas spring 50 coincide with the reference contraction amount dr. Accordingly, the back door 30 is positioned at the normal fully-closed position.

As illustrated in FIG. 7, next, the door control device 70 determines whether a predetermined period of time elapses from the execution of the position correction control (step S114). When the predetermined period of time elapses from the execution of the position correction control (step S114: YES), the door control device 70 ends the position correction control (step S115). Thereafter, the door control device 70 stops the power supply to the drive device 40 and ends the processing. When the predetermined period of time does not elapse from the execution of the position correction control (step S114: NO), the door control device 70 repeats step S114.

Here, the predetermined period of time in step S114 is set to be equal to or longer than a period of time experimentally obtained as a duration of the position correction control necessary for returning the back door 30, which is drawn to the vehicle inner side beyond the normal fully-closed position, to the normal fully-closed position.

Operations and effects of the embodiment will be described.

(1) When the shift of the latch mechanism 61 from the half-latching state to the full-latching state is detected, the door control device 70 executes the position correction control of correcting the position of the back door 30 by driving the motor 43 such that a force in the opening direction acts on the back door 30.

According to this configuration, when the latch mechanism 61 shifts from the half-latching state to the full-latching state, a force in the opening direction acts on the back door 30. That is, a force in the opening direction acts on the back door 30 in a fully closed state restrained to the vehicle body 20 by the latch mechanism 61. Accordingly, even when the back door 30 is drawn to the vehicle inner side beyond the normal fully-closed position, the back door 30 is easily returned to the normal fully-closed position by moving in the opening direction. In addition, even when the back door 30 is distorted due to the drawing-in of the back door 30, a force in the opening direction acts on the back door 30, and thus the distortion of the back door 30 is easily relaxed. Accordingly, it is possible to prevent the appearance of the vehicle 10 from being impaired, and thus it is possible to reduce a feeling of discomfort given to an occupant.

(2) When the shift of the latch mechanism 61 from the unlatching state to the half-latching state is detected, the door control device 70 executes the braking control of applying a braking force to the back door 30 by regenerative braking action of the motor 43.

According to this configuration, when the latch mechanism 61 shifts from the unlatching state to the half-latching state, a braking force is applied to the back door 30. Therefore, when the back door 30 moves in the opening direction due to a reaction force generated accompanying compression of the weather strip 22, a speed of the back door 30 is gradually reduced. Accordingly, occurrence of vibration and abnormal noise of the back door 30 can be prevented.

(3) Even when the shift of the latch mechanism 61 from the half-latching state to the full-latching state is detected, the door control device 70 continues the execution of the braking control until a predetermined period of time elapses since the latch mechanism 61 shifts from the unlatching state to the half-latching state.

For example, in a case of a configuration in which the braking force is not applied to the back door 30 only when the shift of the latch mechanism 61 from the half-latching state to the full-latching state, the shift of the latch mechanism 61 to the full-latching state is completed early, and thus the following inconvenience may occur. That is, the shift of the latch mechanism 61 to the full-latching state is completed while the back door 30, which is drawn to the vehicle inner side beyond the normal fully-closed position, is moving in the opening direction by the reaction force of the weather strip 22. Accordingly, the back door 30 may move forcibly in the opening direction by the reaction force. In this case, the vibration and abnormal noise of the back door 30 may occur.

In this regard, according to the above configuration, even when the shift of the latch mechanism 61 from the half-latching state to the full-latching state is detected, the execution of the braking control is continued until the predetermined period of time elapses since the latch mechanism 61 shifts from the unlatching state to the half-latching state. Therefore, even when the shift of the latch mechanism 61 from the half-latching state to the full-latching state is completed early, the braking force is continuously applied to the back door 30 until the predetermined period of time elapses. Accordingly, the above-described inconvenience can be avoided.

(4) In the position correction control, the door control device 70 applies, to the motor 43, the voltage V1 smaller than a voltage applied during the opening operation of the back door 30 based on an opening operation command signal such that a force in the opening direction acts on the back door 30.

According to this configuration, when the voltage V1 smaller than the voltage applied during the opening operation of the back door 30 based on the opening operation command signal is applied to the motor 43, a force in the opening direction acts on the back door 30. Therefore, when a force in the opening direction acts on the back door 30 accompanying the position correction control, a load generated in the back door 30 and the door lock device 60 accompanying the force can be reduced.

The embodiment can be modified as follows. The embodiment and the following modifications can be implemented in combination with each other within a range of not technically contradicting each other.

The value of the voltage V1 in the position correction control may be changed as appropriate. The value of the voltage V1 may be, for example, equal to or greater than the value of the voltage applied during the opening operation of the back door 30 based on the opening operation command signal.

The predetermined period of time in step S105 may be appropriately changed. In this case, the door control device 70 may start the closing operation of the door lock device 60 simultaneously with the completion of the closing operation of the back door 30, or may start the closing operation of the door lock device 60 before or after the completion of the closing operation of the back door 30.

The door control device 70 may not execute the position correction control after executing the braking control. That is, the door control device 70 may stop the power supply to the motor 43 when the shift of the latch mechanism 61 from the half-latching state to the full-latching state is detected.

The door control device 70 may end the braking control and execute the position correction control, only when the shift of the latch mechanism 61 from the half-latching state to the full-latching state is completed, regardless of the elapse of the predetermined period of time in step S111.

The door control device 70 may not execute the braking control. In this case, the door control device 70 preferably applies the constant voltage V2 to the motor 43 during a period from when the half-latching state of the latch mechanism 61 is detected to when the full-latching state thereof is detected. Accordingly, the position correction control is executed for the back door 30 whose position is maintained in a state where the weather strip 22 is compressed. Even in this case, when the back door 30 moves in the opening direction due to the reaction force generated accompanying the compression of the weather strip 22, the speed of the back door 30 is gradually reduced.

The vehicle 10 may include the drive device 40 instead of the gas spring 50. That is, the vehicle 10 may be provided with one drive device 40 at each of portions on both sides of the back door 30 in the vehicle width direction. Even in this case, the back door 30 may be drawn to the vehicle interior side beyond the normal fully-closed position. Therefore, by applying the door control device 70 to the vehicle 10, the above-described operations and effects (1) to (3) can be achieved.

The door control device 70 may start the closing operation of the door lock device 60 when the shift of the latch mechanism 61 from the unlatching state to the half-latching state is detected. In this case, the closing operation of the door lock device 60 and the braking control are simultaneously started.

The drive device 40 may include the motor 43, a first arm and a second arm to which power of the motor 43 is transmitted, and an electromagnetic clutch configured to switch a transmission state of the power from the motor 43 to the first arm, and the first arm and the second arm may form a link mechanism. In this case, a gas spring 50 is preferably provided between the vehicle body 20 and the back door 30.

The door control device 70 may be applied to a door other than a back door as long as the door rotates about a rotation axis extending along an upper edge of a door opening of a vehicle body.

[Aspect 1] A vehicle door control device is provided that is applied to a vehicle, the vehicle including: a door configured to open and close a door opening of a vehicle body by rotating about a rotation axis extending along an upper edge of the door opening; a drive device including a motor configured to drive the door to open and close; and a door lock device configured to change a restraint state of the door with respect to the vehicle body, the vehicle door control device controlling driving of the motor and driving of the door lock device. The door lock device includes a latch mechanism configured to shift among a full-latching state in which the door is restrained to the vehicle body at a fully-closed position, a half-latching state in which the door is restrained to the vehicle body at a half-closed position, and an unlatching state in which the door is not restrained to the vehicle body. During a closing operation of the door based on a closing operation command signal, the motor is driven to cause the door to perform the closing operation until shift of the latch mechanism from the unlatching state to the half-latching state is detected. The latch mechanism is shifted from the half-latching state to the full-latching state by starting driving of the door lock device simultaneously with or before or after completion of the closing operation of the door. When the shift of the latch mechanism from the half-latching state to the full-latching state is detected, position correction control of correcting a position of the door by driving the motor such that a force in an opening direction acts on the door is executed.

According to the above configuration, when the latch mechanism shifts from the half-latching state to the full-latching state, a force in the opening direction acts on the door. That is, a force in the opening direction acts on the door that is in a fully closed state restrained to the vehicle body by the latch mechanism. Accordingly, even when the door is drawn to a vehicle inner side beyond a normal fully-closed position, the door is moved in the opening direction so that the door is easily returned to the normal fully-closed position. In addition, even in a case where the door is distorted due to the drawing-in of the door, the distortion of the door is likely to be relaxed by the force acting on the door in the opening direction. Accordingly, it is possible to prevent an appearance of the vehicle from being impaired, and thus it is possible to reduce a feeling of discomfort given to an occupant.

[Aspect 2] In the vehicle door control device according to [Aspect 1], the vehicle includes a weather strip fixed to an outer peripheral portion of the door opening to seal between the vehicle body and the door, and when the shift of the latch mechanism from the unlatching state to the half-latching state is detected, braking control of applying a braking force to the door by regenerative braking action of the motor is executed.

According to the above configuration, when the latch mechanism shifts from the unlatching state to the half-latching state, a braking force is applied to the door. Therefore, when the door moves in the opening direction due to a reaction force generated accompanying compression the weather strip, a speed of the door is gradually reduced. Accordingly, occurrence of vibration and abnormal noise of the door can be prevented.

[Aspect 3] In the vehicle door control device according to [Aspect 2], even when the shift of the latch mechanism from the half-latching state to the full-latching state is detected, execution of the braking control is continued until a predetermined period of time elapses since the latch mechanism shifts from the unlatching state to the half-latching state.

For example, in a case of a configuration in which the braking force is not applied to the back door only when the shift of the latch mechanism from the half-latching state to the full-latching state, the shift of the latch mechanism to the full-latching state is completed early, and thus the following inconvenience may occur. That is, when the shift of the latch mechanism to the full-latching state is completed while the door drawn to the vehicle inner side beyond the normal fully-closed position is being moved in the opening direction by the reaction force of the weather strip, the door may be forcibly moved in the opening direction by the reaction force. In this case, vibration and abnormal noise of the door may occur.

In this regard, according to the above configuration, even when the shift of the latch mechanism from the half-latching state to the full-latching state is detected, the execution of the braking control is continued until the predetermined period of time elapses since the latch mechanism shifts from the unlatching state to the half-latching state. Therefore, even when the shift of the latch mechanism from the half-latching state to the full-latching state is completed early, the braking force is continuously applied to the door until the predetermined period of time elapses. Accordingly, the above-described inconvenience can be avoided.

[Aspect 4] A vehicle door control device is provided that is applied to a vehicle, the vehicle including: a door configured to open and close a door opening of a vehicle body by rotating about a rotation axis extending along an upper edge of the door opening; a weather strip fixed to an outer peripheral portion of the door opening to seal between the vehicle body and the door; a drive device including a motor configured to drive the door to open and close; and a door lock device configured to change a restraint state of the door with respect to the vehicle body, the vehicle door control device controlling driving of the motor and driving of the door lock device. The door lock device includes a latch mechanism configured to shift among a full-latching state in which the door is restrained to the vehicle body at a fully-closed position, a half-latching state in which the door is restrained to the vehicle body at a half-closed position, and an unlatching state in which the door is not restrained to the vehicle body. During a closing operation of the door based on a closing operation command signal, the motor is driven to cause the door to perform the closing operation until shift of the latch mechanism from the unlatching state to the half-latching state is detected. When the shift of the latch mechanism from the unlatching state to the half-latching state is detected, braking control of applying a braking force to the door by regenerative braking action of the motor is executed.

According to the above configuration, when the latch mechanism shifts from the unlatching state to the half-latching state, a braking force is applied to the door. Therefore, when the door moves in the opening direction due to a reaction force generated accompanying the compression of the weather strip, a speed of the door is gradually reduced. Accordingly, occurrence of vibration and abnormal noise of the door can be prevented. Accordingly, it is possible to reduce the feeling of discomfort given to the occupant.

According to this disclosure, it is possible to reduce a feeling of discomfort given to an occupant.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle door control device that is applied to a vehicle, the vehicle including:

a door configured to open and close a door opening of a vehicle body by rotating about a rotation axis extending along an upper edge of the door opening;

a drive device including a motor configured to drive the door to open and close; and a door lock device configured to change a restraint state of the door with respect to the vehicle body, the vehicle door control device controlling driving of the motor and driving of the door lock device, wherein the door lock device includes a latch mechanism configured to shift among a full-latching state in which the door is restrained to the vehicle body at a fully-closed position, a half-latching state in which the door is restrained to the vehicle body at a half-closed position, and an unlatching state in which the door is not restrained to the vehicle body, during a closing operation of the door based on a closing operation command signal, the motor is driven to cause the door to perform the closing operation until shift of the latch mechanism from the unlatching state to the half-latching state is detected, the latch mechanism is shifted from the half-latching state to the full-latching state by starting driving of the door lock device simultaneously with or before or after completion of the closing operation of the door, and when a completion of the shift of the latch mechanism from the half-latching state to the full-latching state is detected, position correction control of correcting a position of the door by driving the motor such that a force in an opening direction acts on the door in the fully-closed position is executed.

2. The vehicle door control device according to claim 1, wherein the vehicle includes a weather strip fixed to an outer peripheral portion of the door opening to seal between the vehicle body and the door, and when the shift of the latch mechanism from the unlatching state to the half-latching state is detected, braking control of applying a braking force to the door by regenerative braking action of the motor is executed.

3. The vehicle door control device according to claim 2, wherein even when the shift of the latch mechanism from the half-latching state to the full-latching state is detected, execution of the braking control is continued until a predetermined period of time elapses since the latch mechanism shifts from the unlatching state to the half-latching state.

4. The vehicle door control device according to claim 1, wherein a first voltage applied to the motor in the position correction control is less than a second voltage applied to the motor in the closing operation.

* * * * *